(12) United States Patent
Taylor et al.

(10) Patent No.: US 8,756,912 B2
(45) Date of Patent: Jun. 24, 2014

(54) METHOD OF SETTING A PARTICULATE FILTER REGENERATION SETPOINT BASED ON EXHAUST FLOW MASS

(75) Inventors: Michael V. Taylor, Wolverine Lake, MI (US); Giuseppe Schiavone, Bitonto (IT); Andrea Gravili, Lecce (IT); Pantaleo Barbera, Piemonte (IT)

(73) Assignee: GM Global Technology Operations LLC, Detroit, MI (US)

( * ) Notice: Subject to any disclaimer, the term of this patent is extended or adjusted under 35 U.S.C. 154(b) by 175 days.

(21) Appl. No.: 13/421,922

(22) Filed: Mar. 16, 2012

(65) Prior Publication Data

US 2013/0239551 A1  Sep. 19, 2013

(51) Int. Cl.
    *F01N 3/00* (2006.01)
(52) U.S. Cl.
    USPC .......... 60/274; 60/285; 60/286; 60/295; 60/297

(58) Field of Classification Search
    USPC .......... 60/274, 286, 295, 297, 311
    See application file for complete search history.

(56) References Cited

U.S. PATENT DOCUMENTS

| | | | |
|---|---|---|---|
| 6,829,890 B2 * | 12/2004 | Gui et al. | 60/295 |
| 7,137,247 B2 * | 11/2006 | Koga et al. | 60/295 |
| 7,337,608 B2 * | 3/2008 | Gabe et al. | 60/286 |
| 7,891,174 B2 * | 2/2011 | Gioannini et al. | 60/295 |
| 8,499,550 B2 * | 8/2013 | Perfetto et al. | 60/295 |

* cited by examiner

*Primary Examiner* — Binh Q Tran
(74) *Attorney, Agent, or Firm* — Quinn Law Group, PLLC

(57) ABSTRACT

A method of defining a target regeneration temperature setpoint for exhaust gas upstream of a particulate filter of an exhaust gas treatment system includes as defining the regeneration temperature setpoint to include an idle temperature setpoint when the current vehicle operating mode is classified as an idle mode, and defining the regeneration temperature setpoint to include a driving temperature setpoint when the current vehicle operating mode is classified as a driving mode. The idle temperature setpoint and the driving temperature setpoint are derived individually of and separately from each other, and are based on different criteria.

9 Claims, 2 Drawing Sheets

METHOD OF SETTING A PARTICULATE FILTER REGENERATION SETPOINT BASED ON EXHAUST FLOW MASS

TECHNICAL FIELD

The invention generally relates to a method of controlling an exhaust gas treatment system of a vehicle, and more specifically to a method of defining a regeneration temperature setpoint for a particulate filter of the exhaust gas treatment system.

BACKGROUND

Exhaust gas treatment systems for treating exhaust gas from an engine of a vehicle may include a particulate filter. If the engine is a diesel engine, then the particulate filter may be referred to as a diesel particulate filter. The particulate filter traps particulate matter, i.e., soot, from the exhaust gas of the engine. The particulate filter may include one or more substrates that define a plurality of apertures, through which the exhaust gas must flow. The particulate matter collects on the substrate as the exhaust gas flows through the apertures. The particulate filter is occasionally regenerated to remove the collected particulate matter. Regeneration of the particulate filter includes heating the particulate filter to a temperature sufficient to burn the collected particulate matter for a time period sufficient to completely burn all of the particulate matter off of the substrates of the particulate filter, which converts the particulate matter to carbon dioxide that dissipates into the atmosphere.

During regeneration of the particulate filter, a control module defines a regeneration temperature setpoint, which is a desired temperature of the exhaust gas upstream of the particulate filter. The regeneration temperature setpoint is defined to achieve the required temperature within the particulate filter needed to burn off the particulate matter from the substrate. The control module controls the operation of the exhaust gas treatment system so that the temperature of the exhaust gas is approximately equal to the regeneration temperature setpoint However, different operating modes of the vehicle, such as when the vehicle is at idle, driving, or coasting, affect the exhaust mass flow through the exhaust gas treatment system, which affects the ability of the control module to bring the actual temperature of the exhaust gas upstream of the particulate filter in line with the desired regeneration temperature setpoint.

SUMMARY

A method of defining a regeneration temperature setpoint for a particulate filter of an exhaust gas treatment system is provided. The method includes classifying a current vehicle operating mode as one of a driving mode or an idle mode. The regeneration temperature setpoint is defined based on which one of the driving mode and the idle mode the current vehicle operating mode is classified as. As such, a different regeneration temperature setpoint is defined for each of the driving mode and the idle mode.

A method of controlling a vehicle is also provided. The method includes providing a control module operable to control defining a regeneration temperature setpoint for a particulate filter of an exhaust gas treatment system. The control module is operable to perform the following tasks, including: classifying a current vehicle operating mode as one of a driving mode or an idle mode. The regeneration temperature setpoint is defined to include an idle temperature setpoint when the current vehicle operating mode is classified as the idle mode, and is defined to include a driving temperature setpoint when the current vehicle operating mode is classified as the driving mode. The idle temperature setpoint and the driving temperature setpoint are derived individually of and separately from each other, and are based on different operating criteria. When the current vehicle operating mode is classified as the driving mode, defining the driving temperature setpoint includes relating an estimated exhaust mass flow of the vehicle to a temperature setpoint associated with the estimated exhaust mass flow. When the current vehicle operating mode is classified as the idle mode, defining the idle temperature setpoint includes relating an elapsed time spent in the idle mode to a temperature setpoint associated with the elapsed time spent in the idle mode. The defined driving temperature setpoint or the defined idle temperature setpoint is adjusted based on an estimated percent soot load of the particulate filter. The defined driving temperature setpoint or the defined idle temperature setpoint is adjusted based on a regeneration completion percentage of the particulate filter. The method further includes determining whether the vehicle is operating in a coastdown mode or in a non-coastdown mode. The estimated exhaust mass flow of the vehicle is related to an adjustment value associated with the estimated exhaust mass flow, and the driving temperature setpoint is modified by the adjustment value associated with the estimated exhaust mass flow when the vehicle is operating in the coastdown mode.

Accordingly, the regeneration temperature setpoint is defined based upon the current operating mode of the vehicle, i.e., the idle mode or the driving mode. The regeneration temperature setpoint is defined differently for each operating mode to reflect the different conditions of each mode, such as the different exhaust mass flow through the exhaust gas treatment system during each of the different modes. Defining the regeneration temperature setpoint for the particulate filter provides a more robust strategy for controlling the operation of the exhaust gas treatment system.

The above features and advantages and other features and advantages of the present invention are readily apparent from the following detailed description of the best modes for carrying out the invention when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the invention, as defined by the appended claims.

Figure 1:
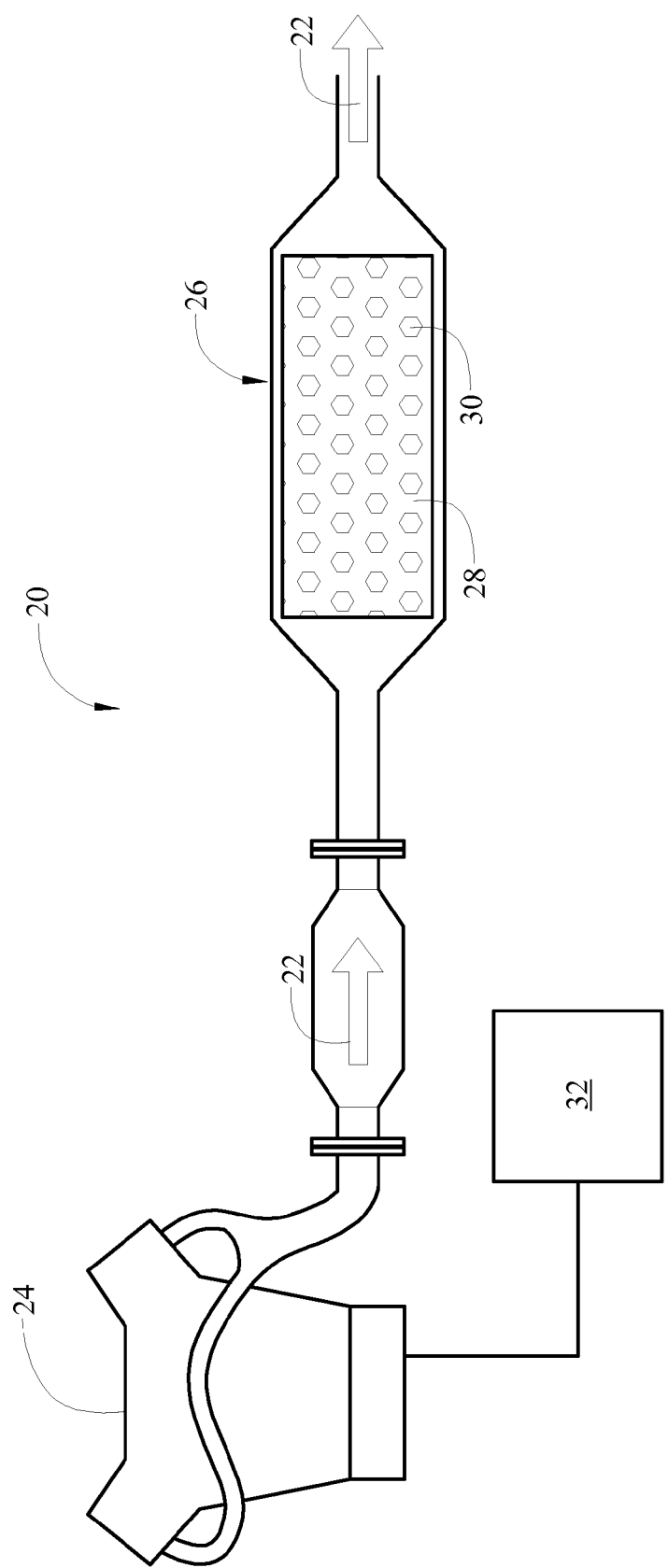
FIG. 1 is a schematic diagram of an engine and an exhaust system of a vehicle.

Referring to FIG. 1, wherein like numerals indicate like parts throughout the several views, an exhaust gas treatment system for a vehicle is shown generally at 20. The exhaust gas treatment system 20 directs and treats exhaust gas, generally indicated by flow arrows 22, from an internal combustion engine 24. The engine 24 preferably includes a diesel engine, but may alternatively include some other style of engine, such as but not limited to a gasoline engine.

The exhaust gas treatment system 20 includes a particulate filter 26. The particulate filter 26 filters particulate matter, i.e., soot, from the exhaust gas of the engine 24. The particulate filter 26 may include one or more substrates 28 that define a plurality of apertures 30, through which the exhaust gas must flow. The particulate matter collects on the substrates 28 as the exhaust gas flows through the apertures 30. The particulate filter 26 is occasionally regenerated to remove the collected particulate matter. Regeneration of the particulate filter 26 includes heating the particulate filter 26 to a temperature sufficient to burn the collected particulate matter for a time sufficient to completely burn all of the particulate matter from the substrate. Burning the particulate matter converts the particulate matter to carbon dioxide that dissipates into the atmosphere.

The vehicle may include a control module 32, such as but not limited to an engine 24 control unit, to control exhaust gas treatment system 20, including defining a regeneration temperature setpoint. The control module 32 may include a computer and/or processor, and include all software, hardware, memory, algorithms, connections, sensors, etc., necessary to manage and control the regeneration of the particulate filter 26. As such, a method, described below and generally shown in FIG. 2 at 34, may be embodied as a program operable on the control module 32. It should be appreciated that the control module 32 may include any device capable of analyzing data from various sensors, comparing data, making the necessary decisions required to control the regeneration of the particulate filter 26, and executing the required tasks necessary to control the regeneration event.

Figure 2:
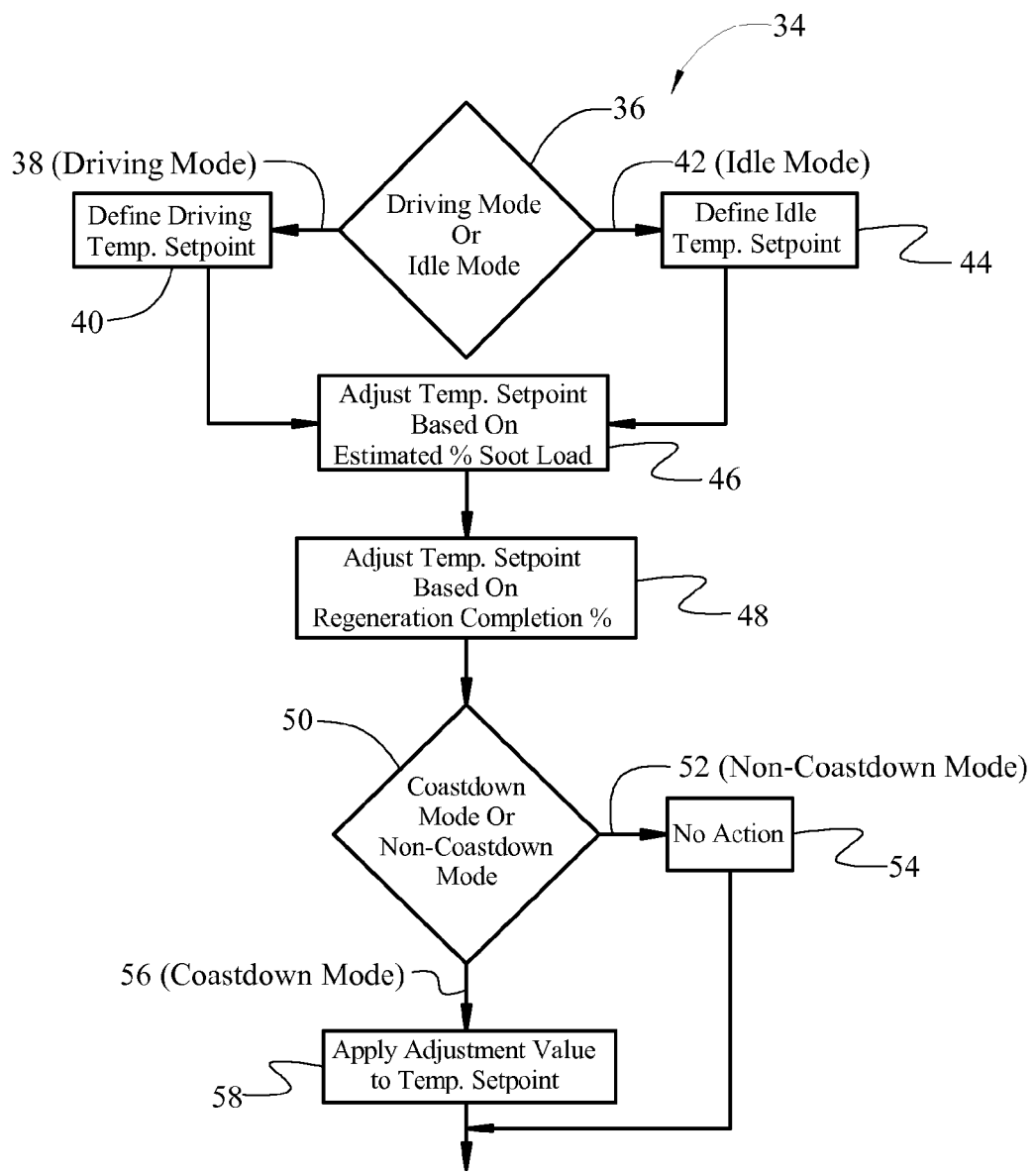
FIG. 2 is a flow chart showing a method of controlling regeneration of a particulate filter of the exhaust system.

Referring to FIG. 2, the method of controlling the vehicle, and more specifically a method of defining the regeneration temperature of the particulate filter 26, is generally shown at 34. The method includes providing the control module 32 operable to define the regeneration temperature setpoint for the particulate filter 26. The regeneration temperature setpoint is a desired temperature of the exhaust gas upstream of the particulate filter 26. The regeneration temperature setpoint is defined to achieve the required temperature within the particulate filter 26 needed to burn off the particulate matter disposed on the substrate. The control module 32 controls the operation of the exhaust gas treatment system 20 so that the temperature of the exhaust gas is approximately equal to the regeneration temperature setpoint As noted above, the control module 32 includes all software, hardware, memory, algorithms, connections, sensors, etc. necessary to manage and control the regeneration of the particulate filter 26. The control module 32 is configured to perform the various tasks of the method described below.

The method includes classifying a current vehicle operating mode as one of a driving mode or an idle mode. The vehicle is defined as operating in the driving mode when the vehicle is moving under power provided by the engine 24. The vehicle is defined as operating in the idle mode when the vehicle is not moving with the engine 24 running at a defined minimum fuel usage rate. The control module 32 may include one or more sensors configured for sensing at least one of a speed of the vehicle, an acceleration rate of the vehicle, or a fuel usage rate of the vehicle. The information sensed is communicated to the control module 32, which uses the information to determine which one of the driving mode and the idle mode the vehicle is currently operating in, generally indicated by box 36.

The regeneration temperature setpoint is defined based on which one of the driving mode and the idle mode the control module 32 determines the vehicle is currently operating in. As such, a different regeneration temperature setpoint is defined for each of the driving mode and the idle mode. The regeneration temperature setpoint is defined to include an idle temperature setpoint when the current vehicle operating mode is classified as the idle mode. The regeneration temperature setpoint is defined to include a driving temperature setpoint when the current vehicle operating mode is classified as the driving mode. The idle temperature setpoint and the driving temperature setpoint are derived individually of and separately from each other, and are based on different operating criteria.

When the current vehicle operating mode is classified as the driving mode, generally indicated by 38, defining the driving temperature setpoint includes relating an estimated exhaust mass flow of the vehicle to a temperature setpoint associated with the estimated exhaust mass flow, generally indicated by box 40. As used herein, the exhaust mass flow of the vehicle is defined as the mass of exhaust gas passing through the particulate filter 26. The exhaust mass flow may be estimated by predicting the exhaust mass flow with a model of the exhaust gas treatment system 20 that is configured to model the operation of the exhaust gas treatment system 20. The exhaust mass flow of the vehicle may be related to a temperature setpoint by referencing a curve or table that relates different values of exhaust mass flow to a temperature setpoint. Accordingly, the control module 32 may estimate the exhaust mass flow from the model of the exhaust gas treatment system 20, and look up the corresponding temperature setpoint by referencing the appropriate curve. The value of the temperature setpoint correlating to the estimated exhaust mass flow is defined as the driving temperature setpoint, and is the regeneration temperature setpoint when the vehicle is operating in the driving mode. It should be appreciated that the value of the driving temperature setpoint will change as the exhaust mass flow of the vehicle changes. The curve or table that relates the exhaust mass flow to the temperature setpoint may be embodied as a look-up table stored in the memory of the control module 32, or may be embodied as an equation representing the curve relating the different values of the exhaust mass flow to the different values of the temperature setpoint.

When the current vehicle operating mode is classified as the idle mode, generally indicated at 42, defining the idle temperature setpoint includes relating an elapsed time spent in the idle mode to a temperature setpoint associated with the elapsed time spent in the idle mode, generally indicated by box 44. The time spent in the idle mode may be sensed and/or measured in any suitable manner, such as with a clock linked with the control module 32. The elapsed time spent in the idle mode may be related to a temperature setpoint by referencing a curve relating different values of elapsed time spent in the idle mode to a temperature setpoint. Accordingly, the control module 32 may measure the duration of time the vehicle has currently been disposed in the idle mode, and look up the corresponding temperature setpoint by referencing the appropriate curve. The value of the temperature setpoint correlating to the elapsed time spent in the idle mode is defined as the idle temperature setpoint, and is the regeneration temperature setpoint when the vehicle is operating in the idle mode. It should be appreciated that the value of the idle temperature setpoint changes as the elapsed time spent in the idle mode increases. The curve or table that relates the elapsed time spent in the idle mode to the temperature setpoint may be embodied as a look-up table stored in the memory of the control module 32, or may be embodied as an equation representing the curve relating the different values of the exhaust mass flow to the different values of the temperature setpoint.

Once one of the driving temperature setpoint or the idle temperature setpoint has been defined, depending upon which operating mode the vehicle is currently classified as operating in, then the defined driving temperature setpoint or the defined idle temperature setpoint may be adjusted based on an estimated percent soot load of the particulate filter 26, generally indicated by box 46. As used herein, the estimated percent soot load of the particulate filter 26 is defined as the percentage of the actual volume of particulate matter accumulated in the particulate filter 26 divided by the total volume of particulate matter that the particulate filter 26 is capable of accumulating. Accordingly, a 100% soot load represents a completely full particulate filter 26.

The percent soot load may be estimated from the model of the exhaust gas treatment system 20 and related to an adjustment value by referencing a curve or table. Accordingly, the control module 32 may estimate the percent soot load from the model of the exhaust gas treatment system 20, and look up the corresponding adjustment value by referencing the appropriate curve. It should be appreciated that the adjustment value will change based on the conditions of the particulate filter 26. The curve or table that relates the percent soot load to the adjustment value may be embodied as a look-up table stored in the memory of the control module 32, or may be embodied as an equation representing the curve relating the different values of the percent soot load to the different adjustment values. Once the adjustment value for the percent soot load is determined, then the regeneration temperature setpoint, defined as either the driving temperature setpoint or the idle temperature setpoint depending upon the current operating mode, is adjusted by the adjustment value. For example, if the vehicle is operating in the driving mode, the driving temperature setpoint is defined as 560° C., and the adjustment value of the percent soot level is defined as −5° C., then the driving temperature setpoint is adjusted downward to 555° C. to define the regeneration temperature setpoint.

Furthermore, once one of the driving temperature setpoint or the idle temperature setpoint has been defined, depending upon which operating mode the vehicle is currently classified as operating in, then the defined driving temperature setpoint or the defined idle temperature setpoint may be adjusted based on a regeneration completion percentage of the particulate filter 26, generally indicated by box 48. As used herein, the regeneration completion percentage of the particulate filter 26 may be defined as either: the percentage of the actual elapsed time spent during regeneration of particulate filter 26 divided by the total estimated time to complete regeneration of the particulate filter 26, or as the percentage of soot mass which has been burnt off of the particulate filter 26 divided by the amount of soot mass which is desired to be burnt off of the particulate filter 26. Accordingly, 50% regeneration completion percentage represents that the regeneration of the particulate filter 26 is half complete, whereas a 100% regeneration completion percentage represents that the regeneration of the particulate filter 26 is fully complete.

Accordingly, the control module 32 may sense and/or measure the actual time spent during regeneration of the particulate filter 26, and divide that by an estimate of the total time required to complete the regeneration of the particulate filter 26 to calculate the regeneration completion percentage. Alternatively, the control module 32 may estimate the regeneration completion percentage by using a model to estimate the amount of soot which has been removed from the particulate filter 26 divided by the desired amount of soot to be removed at completion of the regeneration event. The control module 32 may estimate the total time required to complete the regeneration or the soot mass in the particulate filter 26 from the model of the exhaust gas treatment system 20. The regeneration completion percentage may be related to a corresponding adjustment value by referencing an appropriate curve. It should be appreciated that the adjustment value will change based on the progress of the regeneration of the particulate filter 26. The curve or table that relates the regeneration completion percentage to the adjustment value may be embodied as a look-up table stored in the memory of the control module 32, or may be embodied as an equation representing the curve relating the different values of the regeneration completion percentage to the different adjustment values. Once the adjustment value for the regeneration completion percentage is determined, then the regeneration temperature setpoint, defined as either the driving temperature setpoint or the idle temperature setpoint depending upon the current operating mode, is adjusted by the adjustment value. For example, if the vehicle is operating in the idle mode, and the idle temperature setpoint is defined as 520° C., and the adjustment value of the regeneration completion percentage is defined as 60° C., then the idle temperature setpoint is adjusted upward to 580° C. to define the regeneration temperature setpoint.

The method may further include classifying the current vehicle operating mode to include one of either a coastdown mode or a non-coastdown mode, generally indicated by box 50. As used herein, the coastdown mode is defined as occurring when the vehicle is moving but decelerating while the engine 24 is running at or below a minimum fueling rate. As such, if the vehicle is operating in the driving mode, then the vehicle may further be operating in either the coastdown mode, or in the non-coastdown mode. If the vehicle is operating in the non-coastdown mode, generally indicated at 52, then no further action is taken, generally indicated by box 54, and the regeneration temperature setpoint is defined as described above. However, if the vehicle is operating in the coastdown mode, generally indicated at 56, then the driving temperature setpoint may be adjusted, generally indicated by box 58.

Adjusting the driving temperature setpoint when the current vehicle operating mode is classified as the coastdown mode includes relating the estimated exhaust mass flow of the vehicle to a rate based adjustment value associated with the estimated exhaust mass flow. The exhaust mass flow may be related to a corresponding adjustment value for the coastdown mode by referencing an appropriate curve. It should be appreciated that the adjustment value for the coastdown mode will change based on a change in the exhaust mass flow of the vehicle. The curve or table that relates the exhaust mass flow to the adjustment value for the coastdown mode may be embodied as a look-up table stored in the memory of the control module 32, or may be embodied as an equation representing the curve relating the different values of the exhaust mass flow to the different adjustment values. Once the adjustment value for the coastdown mode is determined, then the driving temperature setpoint is modified or adjusted by the adjustment value for the coastdown mode. For example, if the driving temperature setpoint is defined as 580° C., the adjustment value of the percent soot level is defined as −5° C., the adjustment value of the regeneration completion percentage is defined as 60° C., and the adjustment value of the coastdown mode is defined as −3° C. per second, then the driving temperature setpoint is adjusted to 632° C. after one second of coastdown to define the regeneration temperature setpoint. For every second thereafter at which the exhaust mass flow remains constant, the driving temperature setpoint will decrease by another 3° C. per second. If the exhaust mass flow changes while the vehicle is still in coastdown, the rate of adjustment to the driving temperature setpoint is modified accordingly.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A method of controlling a vehicle, the method comprising:
providing a control module operable to control a regeneration temperature setpoint for a particulate filter of an exhaust gas treatment system, including:
classifying a current vehicle operating mode as one of a driving mode or an idle mode;
defining the regeneration temperature setpoint to include an idle temperature setpoint when the current vehicle operating mode is classified as the idle mode, and defining the regeneration temperature setpoint to include a driving temperature setpoint when the current vehicle operating mode is classified as the driving mode, wherein the idle temperature setpoint and the driving temperature setpoint are derived individually of and separately from each other and based on different operating criteria;
wherein defining the regeneration temperature setpoint when the current vehicle operating mode is classified as the driving mode includes relating an estimated exhaust mass flow of the vehicle to a temperature setpoint associated with the estimated exhaust mass flow to define the driving temperature setpoint;
wherein defining the regeneration temperature setpoint when the current vehicle operating mode is classified as the idle mode includes relating an elapsed time spent in the idle mode to a temperature setpoint associated with the elapsed time spent in the idle mode to define the idle temperature setpoint;
adjusting the defined driving temperature setpoint or the defined idle temperature setpoint based on an estimated percent soot load of the particulate filter;
adjusting the defined driving temperature setpoint or the defined idle temperature setpoint based on a regeneration completion percentage of the particulate filter;
determining whether the vehicle is operating in a coastdown mode or in a non-coastdown mode;
relating the estimated exhaust mass flow of the vehicle to an adjustment value associated with the estimated exhaust mass flow; and
modifying the driving temperature setpoint by the adjustment value associated with the estimated exhaust mass flow when the vehicle is operating in the coastdown mode.

2. A method as set forth in claim 1 wherein relating an estimated exhaust mass flow of the vehicle to a temperature setpoint includes referencing a curve relating different values of exhaust mass flow to a temperature setpoint.

3. A method as set forth in claim 1 wherein relating an elapsed time spent in the idle mode to a temperature setpoint associated with the elapsed time spent in the idle mode includes referencing a curve relating different values of elapsed time spent in the idle mode to a temperature setpoint.

4. A method as set forth in claim 1 further comprising measuring the time spent in the idle mode.

5. A method as set forth in claim 1 further comprising estimating the exhaust mass flow of the vehicle.

6. A method as set forth in claim 1 wherein estimating the exhaust mass flow of the vehicle includes predicting the exhaust mass flow with a model of the exhaust gas treatment system configured to model the operation of the exhaust gas treatment system.

7. A method as set forth in claim 1 wherein classifying the current vehicle operating mode includes sensing at least one of a speed of the vehicle, an acceleration rate of the vehicle, or a fuel usage rate of the vehicle.

8. A method as set forth in claim 1 wherein classifying the current vehicle operating mode includes determining which one of the driving mode and the idle mode in which the vehicle is currently operating based upon at least one of the sensed speed of the vehicle, the sensed acceleration rate of the vehicle, or the sensed fuel usage rate of the vehicle.

9. A method as set forth in claim 1 further comprising providing a control module configured to define the regeneration temperature setpoint.

* * * * *